(12) United States Patent
Zhao et al.

(10) Patent No.: US 12,309,087 B2
(45) Date of Patent: May 20, 2025

(54) IDENTIFYING TIME DOMAIN POSITIONS OF DEMODULATION REFERENCE SIGNALS (DMRS) WITHIN RESOURCES FOR PHYSICAL SIDELINK SHARED CHANNEL (PSSCH) TRANSMISSION

(71) Applicant: GUANGDONG OPPO MOBILE TELECOMMUNICATIONS CORP., LTD., Guangdong (CN)

(72) Inventors: Zhenshan Zhao, Dongguan (CN); Qianxi Lu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 436 days.

(21) Appl. No.: 17/881,329

(22) Filed: Aug. 4, 2022

(65) Prior Publication Data

US 2022/0376864 A1 Nov. 24, 2022

Related U.S. Application Data

(63) Continuation of application No. PCT/CN2020/074398, filed on Feb. 6, 2020.

(51) Int. Cl.
*H04L 5/00* (2006.01)
*H04W 4/46* (2018.01)
*H04W 72/0446* (2023.01)

(52) U.S. Cl.
CPC ....... *H04L 5/0048* (2013.01); *H04W 72/0446* (2013.01); *H04W 4/46* (2018.02)

(58) Field of Classification Search
CPC . H04L 5/0048; H04L 5/0051; H04L 27/2627; H04L 5/0053; H04L 5/0044;
(Continued)

(56) References Cited

U.S. PATENT DOCUMENTS

| 10,057,900 B2 | 8/2018 | Yoon |
| 2017/0094657 A1 | 3/2017 | Yoon |

(Continued)

FOREIGN PATENT DOCUMENTS

| CN | 108353063 A | 7/2018 |
| WO | 2020029225 A1 | 2/2020 |
| WO | 2021155523 A1 | 8/2021 |

OTHER PUBLICATIONS

U.S. Appl. No. 62/938,237 (Year: 2019).*
(Continued)

*Primary Examiner* — Rushil P. Sampat
(74) *Attorney, Agent, or Firm* — Ladas & Parry, LLP

(57) ABSTRACT

A demodulation reference signal (DMRS) configuration method includes: a first device determines, according to a number of time domain symbols occupied by resources for transmitting a Physical Sidelink Share Channel (PSSCH) in one time slot, time domain positions of one or more DMRSs in the resources for transmitting the PSSCH, where the time domain positions of the one or more DMRSs in the resources for transmitting the PSSCH include: the DMRSs are located at a first time domain symbol and a last time domain symbol of the resources for transmitting the PSSCH; or the DMRS is located at a time domain symbol at a middle position of the resources for transmitting the PSSCH; or the DMRS is located at the first time domain symbol of the resources for transmitting the PSSCH.

6 Claims, 23 Drawing Sheets

(58) Field of Classification Search
CPC ..... H04W 72/0446; H04W 4/46; H04W 4/40; H04W 56/001
See application file for complete search history.

(56) References Cited

U.S. PATENT DOCUMENTS

| | | |
|---|---|---|
| 2018/0212733 A1 | 7/2018 | Khoryaev et al. |
| 2022/0014332 A1* | 1/2022 | Wang .................... H04L 5/0094 |
| 2022/0166588 A1* | 5/2022 | Hwang ................. H04L 5/0053 |
| 2022/0190984 A1* | 6/2022 | Lee ....................... H04W 72/20 |

OTHER PUBLICATIONS

WO_2020118723_A1.pdf (Year: 2020).*
Huawei et al: "Sidelink physical layer structure for NR V2X", 3GPP Draft; R1-1911882, 3GPP, Mobile Competence Centre; 650, Route Des Lucioles; F-06921 Sophia-Antipolis Cedex; France, vol. RAN WG1, No. Reno, USA; Nov. 18, 2019-Nov. 22, 2019 Nov. 9, 2019 (Nov. 9, 2019), XP051823064, entire document.
Supplementary European Search Report in the corresponding European application No. 20917354.1, mailed on Dec. 15, 2022.
3GPP TSG RAN WG1 #99 R1-1912810, Reno, USA, Nov. 18-22, 2019, Agenda Item: 7.2.4.1, Source: Apple, Title: On NR V2X Physical Layer Structure, Document for: Discussion/Decision, all pages.
International Search Report in the international application No. PCT/CN2020/074398, mailed on Jun. 30, 2020.
Written Opinion of the International Search Authority in the international application No. PCT/CN2020/074398, mailed on Jun. 30, 2020.

* cited by examiner

A first device determines, according to a number of time domain symbols occupied by resources for transmitting a PSSCH in one time slot, time domain positions of one or more DMRSs in the resources for transmitting the PSSCH

A second device receives a PSSCH and one or more DMRSs, and demodulates the PSSCH based on detected DMRSs — 31

First processing unit 71

FIG. 7

IDENTIFYING TIME DOMAIN POSITIONS OF DEMODULATION REFERENCE SIGNALS (DMRS) WITHIN RESOURCES FOR PHYSICAL SIDELINK SHARED CHANNEL (PSSCH) TRANSMISSION

CROSS-REFERENCE TO RELATED APPLICATION

This application is a continuation of International Application No. PCT/CN2020/074398 filed on Feb. 6, 2020, the disclosure of which is hereby incorporated by reference in its entirety.

BACKGROUND

Device to Device (D2D) communication is a Sidelink (SL)-based transmission technology. Different from a mode of receiving or transmitting communication data by a base station in a traditional cellular system, a D2D system adopts a mode of terminal to terminal direct communication. In a 3rd Generation Partnership Project (3GPP), D2D is divided into different stages for research, including New Radio (NR)-Vehicle to Everything (V2X). Physical Sidelink Share Channel (PSSCH) resources in the NR-V2X include the resources for transmitting a DMRS. The DMRS is used for channel estimation, so that a receiving end terminal can detect the PSSCH. However, DMRS patterns provided in a related art only correspond to cases where the numbers of time domain symbols occupied by the resources for transmitting the PSSCH are certain numbers, so the needs of more scenarios cannot be adapted.

SUMMARY

The disclosure relates to the field of communication, and in particular, to a Demodulation Reference Signal (DMRS) configuration method and receiving method, a device, a chip, a computer readable storage medium, a computer program product, and a computer program.

In order to solve the abovementioned technical problems, the embodiments of the disclosure provide a DMRS configuration method and receiving method, a device, a chip, a computer-readable storage medium, a computer program product, and a computer program.

In a first aspect, a DMRS configuration method is provided, which includes the following operation. A first device determines, according to a number of time domain symbols occupied by resources for transmitting a PSSCH in one time slot, time domain positions of one or more DMRSs in the resources for transmitting the PSSCH. The time domain positions of the one or more DMRSs in the resources for transmitting the PSSCH include: the DMRSs are located at a first time domain symbol and a last time domain symbol of the resources for transmitting the PSSCH; or the DMRS is located at a time domain symbol at a middle position of the resources for transmitting the PSSCH; or the DMRS is located at the first time domain symbol of the resources for transmitting the PSSCH.

In a second aspect, a DMRS receiving method is provided, which includes the following operations. A second device receives a PSSCH and one or more DMRSs, and demodulates the PSSCH based on detected DMRSs. The time domain positions of the one or more DMRSs in the resources for transmitting the PSSCH include: the DMRSs are located at a first time domain symbol and a last time domain symbol of the resources for transmitting the PSSCH; or the DMRS is located at a time domain symbol at a middle position of the resources for transmitting the PSSCH; or the DMRS is located at the first time domain symbol of the resources for transmitting the PSSCH.

In a third aspect, a first device is provided, which includes a memory storing processor-executable instructions and a processor. The processor is configured to execute the stored processor-executable instructions to perform an operation of: determining, according to a number of time domain symbols occupied by resources for transmitting a Physical Sidelink Share Channel (PSSCH) in one time slot, time domain positions of one or more Demodulation Reference Signals (DMRSs) in the resources for transmitting the PSSCH. The time domain positions of the one or more DMRSs in the resources for transmitting the PSSCH include: the DMRSs are located at a first time domain symbol and a last time domain symbol of the resources for transmitting the PSSCH; or the DMRS is located at a time domain symbol at a middle position of the resources for transmitting the PSSCH; or the DMRS is located at the first time domain symbol of the resources for transmitting the PSSCH.

BRIEF DESCRIPTION OF THE DRAWINGS

FIG. 2 illustrates a schematic flowchart of a DMRS configuration method provided by an embodiment of the application.

FIG. 3 is a schematic flowchart of a DMRS receiving method provided by an embodiment of the application.

FIG. 6A and FIG. 6B illustrates schematic diagrams of several patterns of DMRSs in a case where a PSSCH resource occupies 2 time domain symbols.

FIG. 7 illustrates a schematic structural diagram of compositions of a first device provided by an embodiment of the application.

DETAILED DESCRIPTION

In order to provide a more detailed understanding of the features and technical aspects of the embodiments of the disclosure, the implementation of the embodiments of the disclosure will be described in detail below with reference to the accompanying drawings, and the accompanying drawings are for illustrative purposes only and are not intended to limit the embodiments of the disclosure.

The technical solutions in the embodiments of the application are described below with reference to the accompanying drawings in the embodiments of the application. It is apparent that the described embodiments are part rather than all embodiments of the application. All other embodiments obtained by those of ordinary skill in the art based on the embodiments of the application without creative efforts shall fall within the scope of protection of the application.

The technical schemes of the embodiments of the disclosure may be applied to various communications systems, such as a Global System for Mobile Communications (GSM), a Code Division Multiple Access (CDMA) system, a Wideband Code Division Multiple Access (WCDMA) system, a General Packet Radio Service (GPRS) system, a General Packet Radio Service (GPRS), a Long Term Evolution (LTE) system, a Frequency Division Duplex (FDD) system, a Time Division Duplex (TDD) system, a Universal Mobile Telecommunications System (UMTS), a Universal Mobile Telecommunication System (UMTS), a Worldwide Interoperability for Microwave Access (WiMAX) communications system, or a 5G system.

Figure 1A:
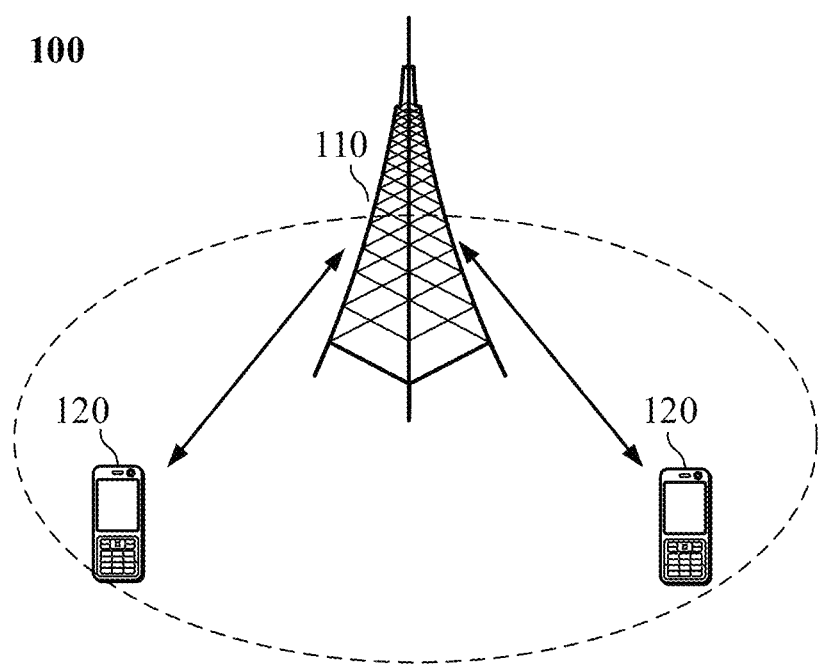
FIG. 1A illustrates a schematic diagram of communication system architecture provided by an embodiment of the application.

Exemplarily, a communication system 100 applied in an embodiment of the application may be as shown in FIG. 1A. The communication system 100 may include a network device 110. The network device 110 may be a device in communication with User Equipment (UE) 120 (or called a communication terminal device or a terminal device). The network device 110 may provide communication coverage for a specific geographical area, and may communicate with the UE located within the coverage. Optionally, the network device 110 may be a Base Transceiver Station (BTS) in the GSM or the CDMA system, may also be a NodeB (NB) in the WCDMA system, and may further be an Evolutional Node B (eNB or eNodeB) in the LTE system or a wireless controller in a Cloud Radio Access Network (CRAN). Or the network device may be a mobile switching center, a relay station, an access point, an on-board device, a wearable device, a hub, a switch, a network bridge, a router, a network-side device in a future 5G network, a network device in a future evolved Public Land Mobile Network (PLMN) or the like.

The communication system 100 further includes at least one UE 120 located within the coverage of the network device 110. A "UE" used herein includes, but not is limited to, an apparatus arranged to receive/send a communication signal through a wired line connection, for example, through Public Switched Telephone Network (PSTN), Digital Subscriber Line (DSL), digital cable and direct cable connections, and/or another data connection/network) and/or through a wireless interface, for example, for a cellular network, a Wireless Local Area Network (WLAN), a digital television network like a Digital Video Broadcasting-Handheld (DVB-H) network, a satellite network and an Amplitude Modulated (AM)-Frequency Modulated (FM) broadcast transmitter, and/or another UE, and/or an Internet of Things (IoT) device. The UE arranged to communicate through a wireless interface may be called a "wireless communication terminal", a "wireless terminal device" or a "mobile terminal device".

Optionally, D2D communication may be performed between UE (User Equipment) 120.

Figure 1B:
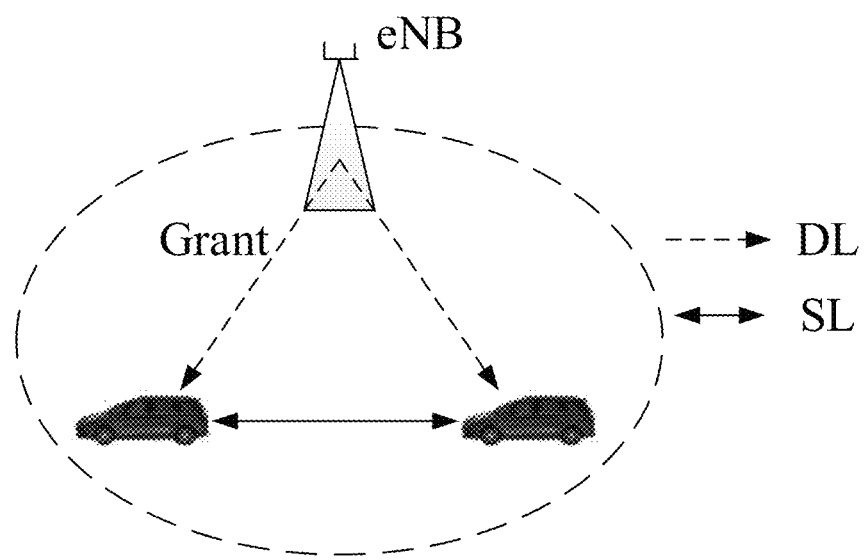
FIG. 1B to FIG. 1G illustrate schematic diagrams of composition scenarios of D2D and V2X.
Figure 1C:
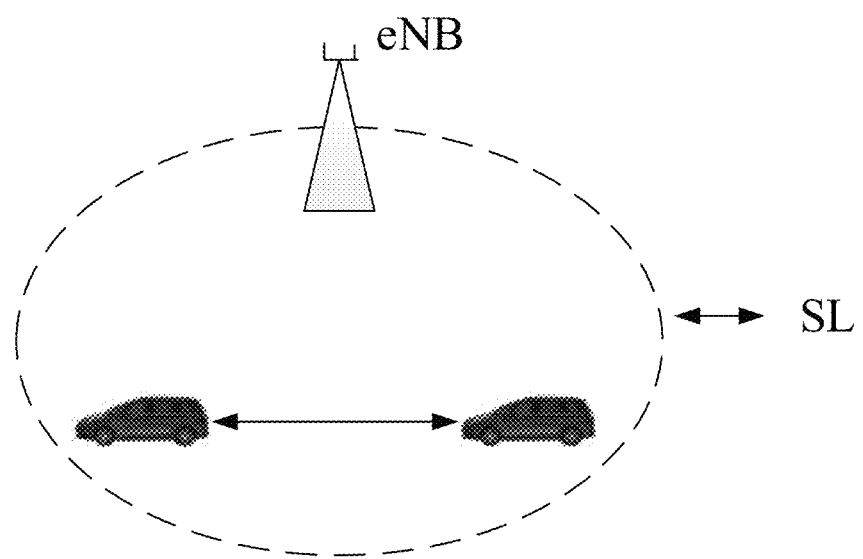
Figure 1D:
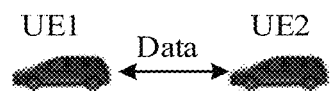

D2D communication is a transmission technology based on a Sidelink (SL). As shown in FIG. 1B and FIG. 1C, a V2X system is based on the D2D transmission technology, and two transmission modes are defined in 3GPP: mode A and mode B. Herein, mode A: the transmission resources of a terminal is allocated by a base station, and the terminal transmits data on the SL according to the resources allocated by the base station. The base station may allocate the resource for single transmission for the terminal, or may allocate the resource for semi-static transmission for the terminal.

Mode B: a vehicle-mounted terminal selects a resource from a resource pool to transmit the data.

NR-V2X: in NR-V2X, automatic driving needs to be supported, so higher requirement are put forward for data interaction among vehicles, such as higher throughput, lower delay, higher reliability, larger coverage, and more flexible resource allocation.

Figure 1E:
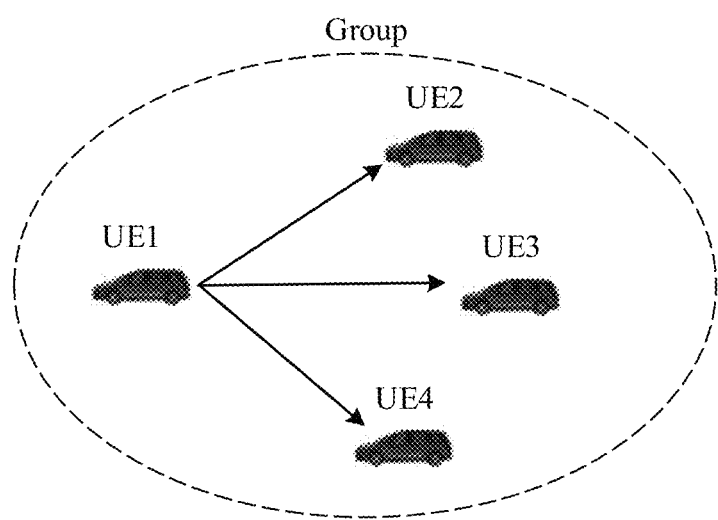
Figure 1F:
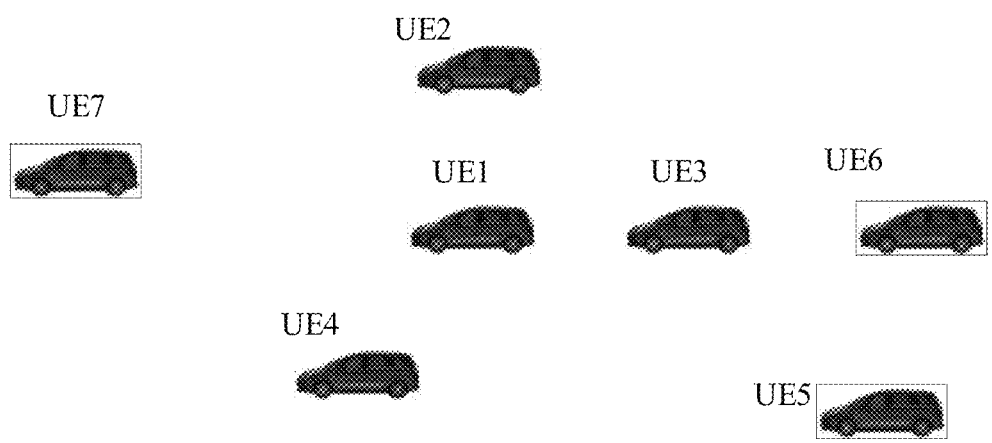

In NR-V2X, a broadcast transmission mode is supported. In NR-V2X, unicast and multicast transmission modes are introduced. For the unicast transmission, a receiving end terminal has only one terminal, as shown in FIG. 1 to FIG. 4B, and unicast transmission is performed between UE 1 and UE 2. For the multicast transmission, the receiving end is all terminal in a communication group, or all terminals within a certain transmission range, as shown in FIG. 1E, UE 1, UE 2, UE 3, and UE 4 form a communication group. UE 1 transmits data. Other terminals in the group are all receiving end terminals. For a broadcast transmission mode, a receiving end is any terminal, as shown in FIG. 1F, UE 1 is a transmitting end terminal, and other terminals around are all receiving end terminals.

A SL Configured Grant (CG) mode: in NR-V2X, resource allocation modes of mode 1 and mode 2 are supported. In mode 2, a terminal independently selects transmission resources from a resource pool to perform side transmission, that is, the abovementioned mode B. In mode 1, a network allocates SL transmission resources for the terminal to transmit resources, that is, the abovementioned mode A. Specifically, the network may allocate SL transmission resources for the terminal in a dynamic scheduling mode; or the network may allocate SL CG transmission resource for the terminal. The CG resource allocation mode mainly includes two CG modes: type-1 configured grant and type-2 configured grant.

In the type-1 configured grant, a network configures SL transmission resources for the terminal through Radio Resource Control (RRC) signaling. The RRC signaling configuration includes all transmission resources and transmission parameters including a time domain resource, a frequency domain resource, a DMRS, and a Modulation Coding Scheme (MCS). After receiving a high level parameter, the UE may perform SL transmission on the configured time frequency resources immediately by using the configured transmission parameters.

In the Type-2 configured grant, a two-step resource configuration mode is adopted, that is, an RRC+DCI mode: first, the RRC signaling configures the transmission resources and transmission parameters including the period of the time domain resources, a redundancy version, the times of repetition, the number of Hybrid Automatic Repeat Quest (HARQ) processes, etc. and then the type-2 configured grant is activated by using the DCI, and simultaneously, other transmission resources and transmission parameters including the time domain resources, the frequency domain resources, the MCS, etc. are configured. When receiving the RRC signaling, the UE cannot perform the SL transmission by using the resources and parameters configured by using the high level parameter, and can perform the SL transmission only after receiving a corresponding DCI activation and configuring other resources and transmission parameters. In addition, a network may deactivate the configuration transmission through DCI. When the terminal receives the deactivated DCI, the SL transmission cannot be performed by using the transmission resources any longer.

If the network allocates the transmission resources of the CG for the CG, and when the terminal has SL data to transmit, transmission may be performed by directly using the transmission resources without transmitting a Scheduling Request (SR)/Buffer Status Report (BSR) to a network, so as to reduce the time delay.

In NR-V2X, automatic driving needs to be supported, so higher requirement are put forward for data interaction among vehicles, such as higher throughput, lower delay, higher reliability, larger coverage, and more flexible resource allocation. In an NR-V2X system, a plurality of transmission modes are introduces, including mode 1 and mode 2. Mode 1 is that a network allocates transmission resources for a terminal (that is, abovementioned mode A), and mode 2 is that the terminal selects transmission resources (that is, abovementioned mode B).

Figure 1G:
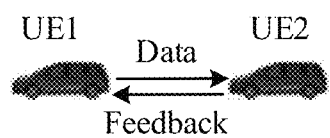

In NR-V2X, in order to improve the transmission reliability, a feedback channel is introduced on a SL, as shown in FIG. 1G. UE 1 and UE 2 form a unicast transmission. UE 1 transmits SL data to UE 2. The UE 2 transmits SL feedback information to UE 1 according to a received SL data detection result, that is, HARQ Acknowledgment (ACK) or Negative Acknowledgment (NACK). UE 1 receives the feedback information of the UE 2, and determines whether to transmit the repeat of the data to UE2. UE 1 may determine whether to receive the feedback information transmitted by receiving end terminal UE 2. For example, for broadcast communication, the receiving end does not need to perform feedback. For unicast communication, the receiving end needs to perform feedback in order to improve the reliability of a system. Specifically, UE 1 carries indication information in the Sidelink Control Information (SCI), so as to indicate whether the receiving end needs to perform SL feedback.

In NR-V2X, the PSSCH reference signal is designed as follows.

Figure 1H:
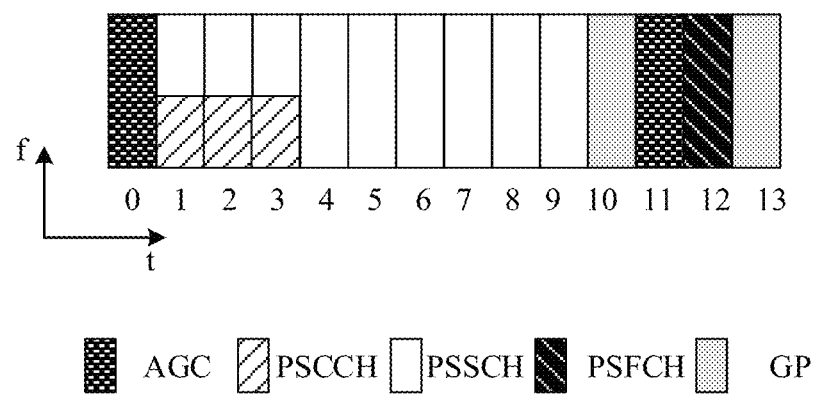
FIG. 1H to FIG. 1J illustrate schematic diagrams of several DMRS patterns.

A PSSCH resource includes a resource configured to transmitting a DMRS. The DMRS is used for channel estimation, so that a receiving end terminal can detect the PSSCH. In NR-V2X, the number of time domain symbols that can be used for SL transmission in one time slot is 7, 8, 9, . . . , 14, including symbols used as Automatic Gain Control (AGC) and symbols used as a Guard Period (GP). In one time slot, the multiplexing form of PSSCH, PSCCH, and PSFCH is shown in FIG. 1H. The frequency domain start positions of the PSCCH and the PSSCH are aligned. The PSCCH occupies X Physical Resource Blocks (PRBs) in a sub-band, and X is less than or equal to the size of the sub-band. The PSCCH starts from a second available SL time domain symbol and occupies 2 or 3 time domain symbols. The PSFCH occupies the second from the last and the third from the last time domain symbols of the time domain symbols that can be used for the SL transmission in one time slot. The last time domain symbol is used as GP, the first time domain symbol of the 2 time domain symbols of the PSFCH may be used as the AGC, and the last time domain symbol of the time domain symbols occupied by PSSCH is the GP. One sub-band includes a plurality of PRBs with continuous frequency domains.

Figure 1I:
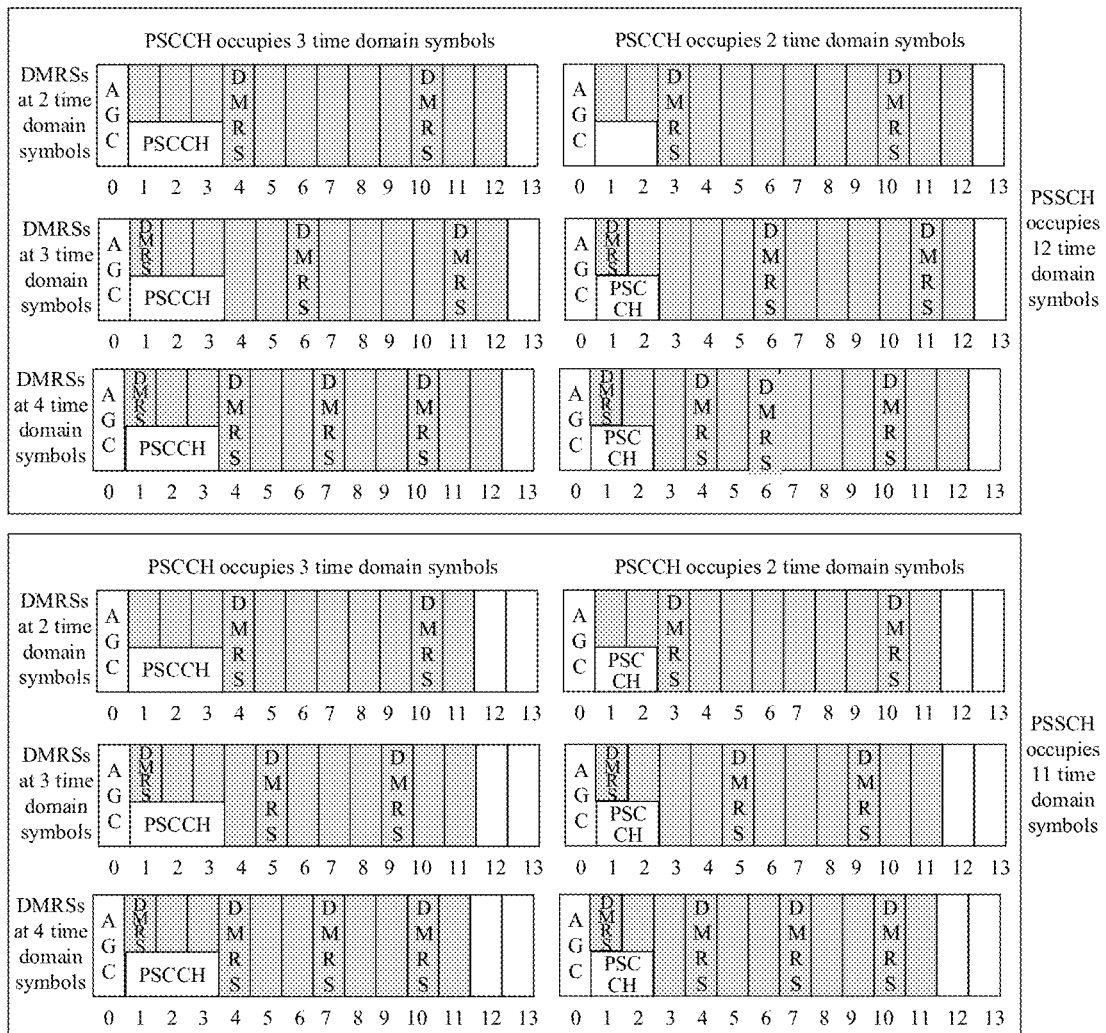
Figure 1J:
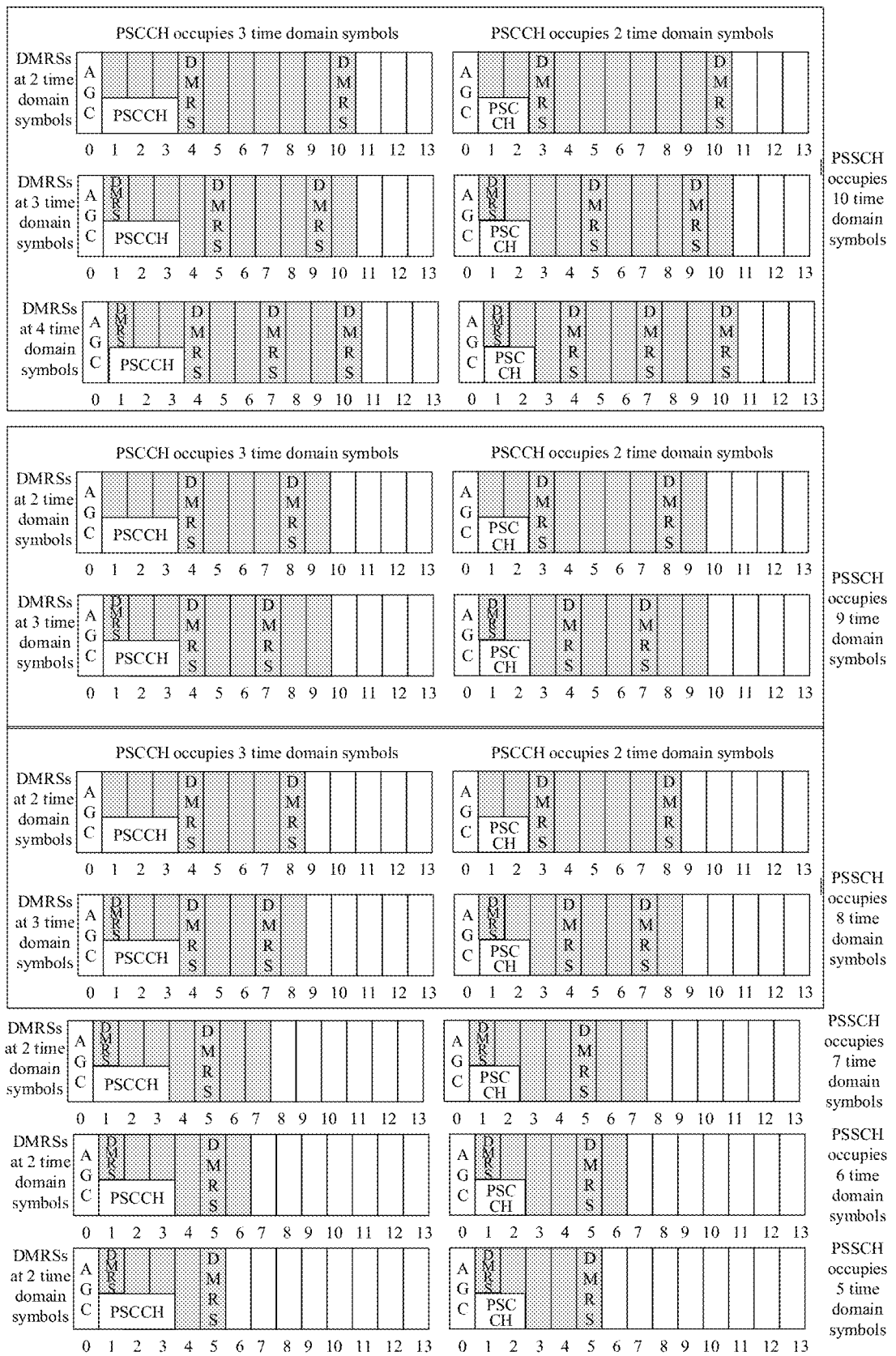

In a related art, the patterns of PSSCH DMRSs are shown referring to FIG. 1I and FIG. 1J, which respectively give the patterns of the DMRSs in cases where the PSSCH (gray parts in the drawings) occupy 5 to 12 time domain symbols (namely, Orthogonal Frequency Division Multiplexing (OFDM) symbols).

It can be seen that, in a related art, only the patterns of the DMRSs in the cases where the PSSCH occupy 5 to 12 OFDM symbols (not including the symbols used as the AGC and the GP) are defined. However, if the number of the symbols that can be used for SL transmission in one time slot is 7, 8 and 9 and the SL symbols include the PSFCH, the symbols used for PSSCH transmission is 2, 3 and 4, and the patterns of the DMRSs in such cases are not determined at present.

It should be understood that the terms "system" and "network" herein are often used interchangeably herein. The term "and/or" in this specification describes only an association relationship for describing associated objects and represents that three relationships may exist. For example, A and/or B may represent the following three cases: Only A exists, both A and B exist, and only B exists. In addition, the character "/" herein generally indicates that the contextual objects are in an "or" relationship.

In order to provide a more detailed understanding of the features and technical aspects of the embodiments of the disclosure, the implementation of the embodiments of the disclosure will be described in detail below with reference to the accompanying drawings, and the accompanying drawings are for illustrative purposes only and are not intended to limit the embodiments of the disclosure.

An embodiment of the disclosure provides a DMRS configuration method, as shown in FIG. 2, including the following step.

At S21, a first device determines, according to a number of time domain symbols occupied by resources for transmitting a PSSCH in one time slot, time domain positions of one or more DMRSs in the resources for transmitting the PSSCH.

The time domain positions of the one or more DMRSs in the resources for transmitting the PSSCH include:
  the DMRSs are located at a first time domain symbol and a last time domain symbol of the resources for transmitting the PSSCH; or
  the DMRS is located at a time domain symbol at a middle position of the resources for transmitting the PSSCH; or
  the DMRS is located at the first time domain symbol of the resources for transmitting the PSSCH.

Correspondingly, an embodiment of the disclosure further provides a DMRS receiving method, as shown in FIG. 3, including the following step.

At S31, a second device receives a PSSCH and one or more DMRSs, and demodulates the PSSCH based on detected DMRSs.

The time domain positions of the one or more DMRSs in resources for transmitting the PSSCH is:
  the DMRSs are located at a first time domain symbol and a last time domain symbol of the resources for transmitting the PSSCH; or
  the DMRS is located at a time domain symbol at a middle position of the resources for transmitting the PSSCH; or
  the DMRS is located at the first time domain symbol of the resources for transmitting the PSSCH.

In the present embodiment, the foregoing first device and second device may be two terminal devices, or two pieces of UE, particularly, may be two devices that can transmit and receive corresponding information in a V2X scenario, for example, may be UE 1 and UE 2 as shown in FIG. 1G. In addition, in the present embodiment, the first device may be a transmitting end device (or a transmitting end UE), and the second device may be a receiving end device (or a receiving end UE).

In the scheme provided by the present embodiment, the number of the time domain symbols occupied by the resources for transmitting the PSSCH is greater than or equal to 2 and is less than or equal to 4. That is to say, the present embodiment is mainly about how to design the patterns of the DMRs in a case where the number of the time domain symbols occupied by PSSCH resources is between 2 and 4.

It is to be understood that the number of the time domain symbols occupied by resources for transmitting the above-mentioned PSSCH is between 2 and 4. The first time domain symbol for SL transmission is not included, and the symbol is used as the AGC at a receiving end. The next time domain symbol of the time domain symbol occupied by the PSSCH is also not included, and the symbol is used as the GP.

Optionally, the data on the first time domain symbol for the SL transmission is a duplicate or copy of the data on a second time domain symbol for the SL transmission. For example, the PSSCH and the PSCCH are transmitted on the second time domain symbol, then the data of the PSSCH and the PSCCH on the second symbol is copied on the first symbol.

Descriptions are respectively made below by taking the numbers of the time domain symbols occupied by the PSSCH resource as 2, 3, and 4 as examples.

Example 1, a DMRS Pattern when the Resources for Transmitting PSSCH are 4 Symbols Specifically, in a case where the number of the time domain symbols occupied by the resources for transmitting the PSSCH in one time slot is 4, the number of the time domain symbols occupied by the DMRS is 2, and the DMRSs are located at a first time domain symbol and a last time domain symbol of the resources for transmitting the PSSCH.

It is to be noted that the time domain symbols occupied by the PSSCH are 4 continuous time domain symbols. In one time slot, the 4 continuous time domain symbols may be at any position at the beginning, middle, or back. No limits are made thereto in the present example.

In addition, a PSCCH corresponding to the PSSCH occupies 2 time domain symbols or 3 time domain symbols of the resources for transmitting the PSSCH.

Since the PSCCH and the PSSCH are transmitted together, and the PSCCH occupies 2 or 3 time domain symbols, the DMRS patterns where the PSCCH occupies 2 and 3 symbols are respectively considered when the PSSCH occupies 4 time domain symbols. In the present example, the PSCCH and the PSSCH have the same starting point on the time domain, or it can be understood that the starting time domain symbols of the PSCCH and the PSSCH are the same. For example, the first time domain symbols of the PSCCH and the PSSCH is a second time domain symbol of all time domain symbols that can be used for SL transmission.

Figure 4A:
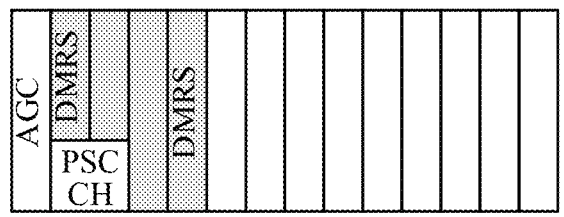
FIG. 4A and FIG. 4B illustrate schematic diagrams of several patterns of DMRSs in a case where a PSSCH resource occupies 4 time domain symbols provided by an embodiment of the application.
Figure 4B:
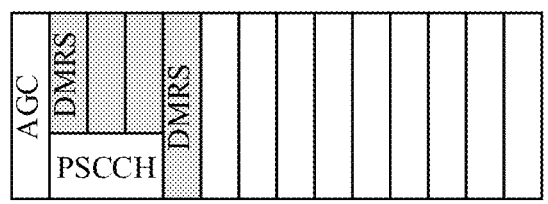

FIG. 4A and FIG. 4B give specific DMRS patterns, herein FIG. 4A and FIG. 4B respectively correspond to the cases where the PSCCH occupies 2 and 3 time domain symbols. In FIG. 4A and FIG. 4B, white time domain symbols represent the time domain symbols that cannot be used for PSSCH transmission. This part of time domain symbols may include at least one of the following: GP symbols, symbols occupied by PSFCH, downlink symbols or flexible symbols on shared carriers, etc.

In FIG. 4A and FIG. 4B, gray time domain symbols represent the time domain symbols that can be used for PSSCH transmission. The symbol previous to a symbol available for the first PSSCH is used as the AGC.

It is to be noted that the drawing only exemplarily shows the number of symbols that can be used for PSSCH transmission, and is not limited to the time domain positions of symbols for PSSCH transmission in one time slot. For example, the drawing gives that the time domain symbols for PSSCH transmission are at previous positions in one time slot; and the time domain symbols for the PSSCH transmission may also be posterior time domain symbols in one time slot, for example, time domain symbols 6, 7, 8, and 9 are occupied, symbol 10 is GP, symbols 11 and 12 are PSFCH, and symbol 13 is GP.

It can be seen through FIG. 4A and FIG. 4B that, in a case where the time domain resources for transmitting the PSSCH are 4 time domain symbols, the DMRS occupies the first time domain symbol and the last time domain symbol. In addition, there is a corresponding resource for transmitting the PSCCH in the 4 time domain symbols for transmitting the PSSCH. The PSCCH may multiplex 2 time domain symbols of the 4 time domain symbols, as shown in FIG. 4A, the position of the starting time domain symbol of the PSCCH is the same as that of the starting time domain symbol of the PSSCH; or, the PSCCH may multiplex 3 time domain symbols of the 4 PSCCH time domain symbols, as shown in FIG. 4B, the position of the starting time domain symbol of the PSCCH is also the same as that of the starting time domain symbol of the PSSCH. Similarly, the time domain resources of PSCCH are also continuous.

That is to say, in the present example, for the case where the PSSCH resource occupies 4 time domain symbols, 2 time domain symbols for transmitting the DMRS may be included, which are respectively:

the first time domain symbol of the PSSCH (or called the resource for transmitting the PSSCH) includes the DMRS; and the last time domain symbol of the PSSCH (or called the resource for transmitting the PSSCH) includes the DMRS.

Correspondingly, the second device may be understood as a receiving end device, or a receiving end UE. The PSSCH may be demodulated by detecting the DMRS, and specific demodulation processing will not be elaborated in the present embodiment.

It is to be noted that the second device determines where to detect a DMRS according to the number of the time domain symbols occupied by PSSCH resources and the number of time domain symbols of the PSSCH resources occupied by the PSCCH. For example, when the PSSCH occupies 4 time domain symbols, it may be determined that the DMRS is determined in the first and last time domain symbols. At the second device, channel estimation of a middle time domain symbol may be performed according to the detected DMRS on the first time domain symbol and the detected DMRS on the last time domain symbol. Specifically, the channel estimation may be performed by performing interpolation calculation through the detected DMRSs on the first time domain symbol and the last time domain symbol.

By adopting the scheme that the DMRS occupies the first and last symbols of the PSSCH symbols provided by the present example, the channel estimation on a middle time domain symbol of the time domain symbols of two DMRSs may be obtained by performing interpolating on channel estimation results on the time domain symbols corresponding to the two DMRSs, so that better channel estimation performance may be achieved.

Example 2, a DMRS Pattern when the Resources for Transmitting PSSCH are 3 Symbols The present example determines the pattern of the DMRS in combination with the number of the time domain symbols occupied by the PSCCH and the number of the PSSCH time domain symbols.

In one case, the PSCCH occupies 2 time domain symbols in the resources for transmitting the PSSCH.

Specifically, in a case where the number of the time domain symbols occupied by the resources for transmitting the PSSCH in one time slot is 3 and the PSCCH corresponding to the PSSCH occupies 2 time domain symbols of the resources of the PSSCH, the number of the time domain symbols occupied by the DMRS is 2, and the DMRSs are located at the first time domain symbol and the last time domain symbol of the resources for transmitting the PSSCH.

Figure 5A:
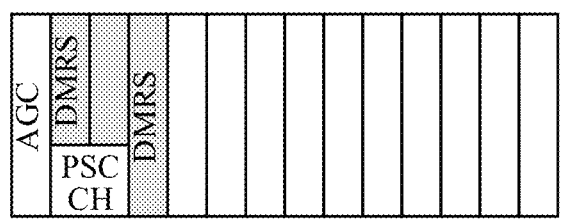
FIG. 5A to FIG. 5C illustrate schematic diagrams of several patterns of DMRSs in a case where a PSSCH resource occupies 3 time domain symbols provided by an embodiment of the application.

For example, referring to FIG. 5A, the 3 time domain symbols for transmitting the PSSCH are gray part in the drawing. When the PSCCH occupies 2 time domain symbols, the transmission resources for transmitting the PSSCH may include 2 time domain symbols for transmitting the DMRS, which are located at the first and last time domain symbols located in the PSSCH.

In addition, in FIG. 5A, time domain symbols in a white part after the gray part represent the time domain symbols that cannot be used for PSSCH transmission. Similar to example 1, the time domain symbols of this part may include at least one of the following: GP symbols, symbols occupied by PSFCH, downlink symbols or flexible symbols on shared carriers, etc. The symbol previous to a symbol available for the first PSSCH in FIG. 5A is used as the AGC.

In another case, the PSCCH occupies 3 time domain symbols in the resources for transmitting the PSSCH.

Specifically, in a case where the number of the time domain symbols occupied by the resources for transmitting the PSSCH in one time slot is 3 and the PSCCH corresponding to the PSSCH occupies 3 time domain symbols of the resources of the PSSCH, the number of the time domain symbols occupied by the DMRS is 2, and the DMRSs are located at the first time domain symbol and the last time domain symbol of the resources for transmitting the PSSCH.

Figure 5B:
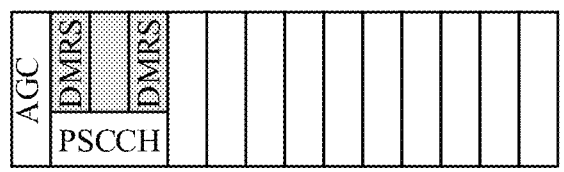

For example, referring to FIG. 5B, the 3 time domain symbols for transmitting the PSSCH are the gray part in the drawing. When the PSCCH occupies 3 time domain symbols, the transmission resources for transmitting the PSSCH may include 2 time domain symbols for transmitting the DMRS, which are located at the first and last time domain symbols of the transmission resources for transmitting the PSSCH.

In addition, in FIG. 5B, time domain symbols in the white part after the gray part represent the time domain symbols that cannot be used for PSSCH transmission. Similar to example 1, this part of time domain symbols may include at least one of the following: GP symbols, symbols occupied by PSFCH, downlink symbols or flexible symbols on shared carriers, etc. The symbol previous to a symbol available for the first PSSCH in FIG. 5B is used as the AGC.

In another case, the PSCCH occupies 3 time domain symbols in the resources for transmitting the PSSCH.

Specifically, in a case where the number of the time domain symbols occupied by the resources for transmitting the PSSCH in one time slot is 3 and the PSCCH corresponding to the PSSCH occupies 3 time domain symbols of the resources of the PSSCH, the number of the time domain symbol occupied by the DMRS is 1, the DMRS is located at a second time domain symbol of the resources for transmitting the PSSCH.

Figure 5C:
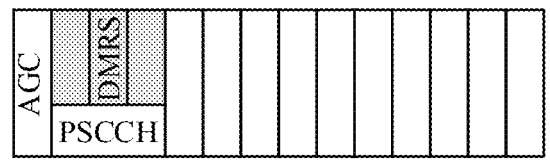

For example, referring to FIG. 5C, the 3 time domain symbols for transmitting the PSSCH are the gray part in the drawing. When the PSCCH occupies 3 time domain symbols, the transmission resources for transmitting the PSSCH may include 1 time domain symbol for transmitting the DMRS, which is the time domain symbol located at the middle position of the transmission resources for transmitting the PSSCH, and the DMRS is located at the second time domain symbol.

In addition, in FIG. 5C, time domain symbols in the white part after the gray part represent the time domain symbols that cannot be used for PSSCH transmission. Similar to example 1, this part of time domain symbols may include at least one of the following: GP symbols, symbols occupied by PSFCH, downlink symbols or flexible symbols on shared carriers, etc. The symbol previous to a symbol available for the first PSSCH in FIG. 5C is used as the AGC.

The abovementioned latter two cases can be understood that in a case where the number of the time domain symbols occupied by the resources for transmitting the PSSCH in one time slot is 3 and the PSCCH corresponding to the PSSCH occupies 3 time domain symbols of the resources of the PSSCH, the resources for transmitting the PSSCH may include 1 or 2 time domain symbols for transmitting the DMRS.

When the PSCCH occupies 3 time domain symbols,
  if there is 1 DMRS symbol, the DMRS is located at a second time domain symbol of the PSSCH; and
  if there are 2 DMRS symbols, the DMRS is located at the first and last time domain symbols of the PSSCH.

Correspondingly, the second device may be understood as a receiving end device, or a receiving end UE. The PSSCH may be demodulated by detecting the DMRS, and specific demodulation processing will not be elaborated in the present embodiment.

It is to be noted that the second device determines where to detect a DMRS according to the number of the time domain symbols occupied by PSSCH resources and the number of time domain symbols of the PSSCH resources occupied by the PSCCH. For example, in a case where the PSSCH occupies 3 time domain symbols, and the PSCCH occupies 2 time domain symbols, it may be determined that 2 DMRSs need to be detected, and the positions thereof are the time domain symbols occupied by the first and last PSCCHs. Or, in a case where the PSSCH occupies 3 time domain symbols, and the PSCCH occupies 3 time domain symbols, it may be determined that 2 DMRSs need to be detected, and the positions thereof are the time domain symbols occupied by the first and last PSCCHs. Or, in a case where the PSSCH occupies 3 time domain symbols, and the PSCCH occupies 3 time domain symbols, it may be determined that 1 DMRS needs to be detected, and the position thereof is the second time domain symbol of the time domain symbols occupied by the PSCCH, that is, the middle time domain symbol.

The second device may perform channel estimation according to the detected DMRS on the first time domain symbol and the detected DMRS on the last time domain symbol. The channel estimation of the middle symbol may be the channel estimation obtained by performing difference value calculation on the DMRSs of the detected first time domain symbol and the last time domain symbol. Then, a final demodulation result is obtained.

Or, the second device may perform channel estimation according to the DMRS of the detected middle time domain symbol. At this moment, the DMRS is at a middle position, and the channel estimation result of the DMRS may be used as the channel estimation of the previous time domain symbol and the latter time domain symbol. Since the time domain symbols before and after the estimation channel are adjacent to their time domain positions, better channel estimation performance can be achieved through such approximate estimation processing.

By adopting the present example, a scheme is provided that in a case where the number of the time domain symbols occupied by the resources for transmitting the PSSCH in one time slot is 3 and the PSCCH corresponding to the PSSCH occupies 3 time domain symbols of the resources of the PSSCH, when 2 DMRSs time domain symbols are included, the 2 DMRSs respectively occupy the time domain symbols of the first and third PSSCHs, and when 1 DMRS is included, the DMRS occupies a middle time domain symbol. Thus, better channel estimation performance can be achieved.

Example 3, a DMRS Pattern when the Resources for Transmitting PSSCH are 2 Symbols The present example determines that there is 1 or 2 DMRS in combination with the number of the time domain symbols occupied by the PSCCH and the number of the PSSCH time domain symbols, which are as follows respectively.

In a scenario with 2 DMRSs:
in a case where the number of the time domain symbols occupied by the resources for transmitting the PSSCH in one time slot is 2 and the PSCCH corresponding to the PSSCH occupies 2 time domain symbols of the resources of the PSSCH, the number of the time domain symbols occupied by the DMRS is 2, and the DMRSs are located at the first time domain symbol and the last time domain symbol of the resources for transmitting the PSSCH.

In a scenario with 1 DMRS:
in a case where the number of the time domain symbols occupied by the resources for transmitting the PSSCH in one time slot is 2 and the PSCCH corresponding to the PSSCH multiplexes 2 time domain symbols of the resources of the PSSCH, the number of the time domain symbols occupied by the DMRS is 1, that is, the DMRS is located at the first time domain symbol of the resources for transmitting the PSSCH.

Figure 6A:
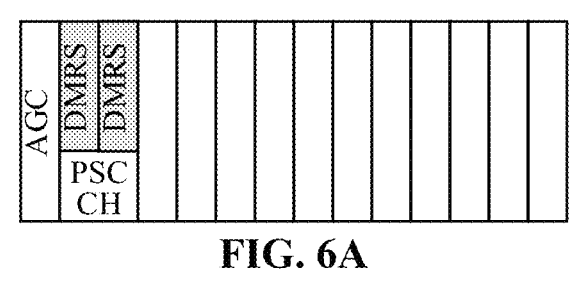
Figure 6B:
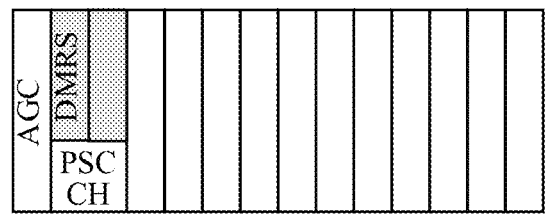

As shown in FIG. 6A and FIG. 6B, when the PSSCH occupies 2 time domain symbols, the PSCCH also occupies 2 time domain symbols, and the PSCCH and the PSSCH are Frequency Division Multiplexing (FDM), that is, occupy different time domain resources. At this moment, the number of the time domain symbols occupied by the DMRS is 1 or 2. Specifically, as shown in FIG. 6B, when the DMRS occupies 1 time domain symbol, the first time domain symbol (the gray time domain symbol part in the drawing) of the PSSCH is occupied. As shown in FIG. 6A, when the DMRS occupies 2 time domain symbol, the first and last time domain symbols of the resources for transmitting the PSCCH are occupied.

In addition, in FIG. 6A and FIG. 6B, time domain symbols in the white part after the gray part represent the time domain symbols that cannot be used for PSSCH transmission. Similar to example 1, this part of time domain symbols may include at least one of the following: GP symbols, symbols occupied by PSFCH, downlink symbols or flexible symbols on shared carriers, etc. The symbol previous to a symbol available for the first PSSCH is used as the AGC.

Correspondingly, the second device may be understood as a receiving end device, or a receiving end UE. The PSSCH may be demodulated by detecting the DMRS, and specific demodulation processing will not be elaborated in the present embodiment.

It is to be noted that the second device determines where to detect a DMRS according to the number of the time domain symbols occupied by PSSCH resources and the number of time domain symbols of the PSSCH resources occupied by the PSCCH. For the present example, the second device may be configured to: determine that 2 DMRSs need to be detected in a case where the PSSCH occupies 2 time domain symbols, and the PSCCH occupies 2 time domain symbols, and the positions thereof are the time domain symbols occupied by the first and last PSCCHs; or determine that 1 DMRS needs to be detected in a case where the PSSCH occupies 2 time domain symbols, and the PSCCH occupies 2 time domain symbols, and the position thereof is the first time domain symbol occupied by the PSCCH.

Then, the second device may demodulate the PSSCH according to a detection condition of the DMRS.

In the present example, the case that two DMRSs are detected is the same as the foregoing example, which will not be elaborated. Different from the foregoing example, the second device in the present example can only detect the DMRS of the first time domain symbol. When the DMRS of the first time domain symbol can be detected, the second device can perform channel estimation and signal demodulation based on the detected DMRS. The channel estimation and signal demodulation result of the DMRS of the first time domain symbol may be applied to another symbol, so that the channel estimation of the second device may be executed as early as possible by placing the DMRS on the first time domain symbol.

It can be seen that, by adopting the scheme provided by the present example, when both symbols include the DMRS, the channel estimation performance may be improved. When only one symbol includes the DMRS, the DMRS is located at the first symbol, and the channel estimation may be performed as early as possible, so that the time delay is reduced.

The foregoing examples 1 to 3 provide that the number and the position of the time domain symbols in the resources for transmitting the PSSCH occupied by the DMRS in combination with the number of the time domain symbols occupied by the PSCCH in a case where the numbers of the time domain symbols occupied by the PSSCH resources are 2, 3, and 4.

In the abovementioned embodiment, a DMRS design has the following features.

The DMRS only exists in the PRB occupied by the PSSCH. When a certain time domain symbol of the PRB includes the PSSCH DMRS, the PRB occupied by each PSSCH includes the DMRS. One PRB resource may include 12 sub-carriers, and the sub-carrier interval is one of {15, 30, 60, 120} kHz.

The PSSCH DMRS does not occupy the resource where the PSCCH is located.

In each PRB including the DMRS, the DMRS symbol occupies 3 sub-carriers, and 4 sub-carriers are separated between two adjacent DMRS symbols.

It can be seen that, by adopting the abovementioned scheme, the positions of the one or more DMRSs can be set on a first time domain symbol, or the first time domain symbol and a last time domain symbol, or a middle time domain symbol of the time domain symbols for transmitting the PSCCH, so that more solutions for setting DMRS patterns can be provided. Moreover, the scheme provided by the present embodiment can adapt to the needs of more scenarios, particularly, the scenarios where the number of time domain symbols for transmitting the PSCCH is 2, 3, and 4. In addition, the DMRSs are set on the first symbol and the last time domain symbol of the time domain symbols for transmitting the PSCCH, and the channel estimation on a middle symbol of the time domain symbols of two DMRSs may be obtained by performing interpolating on channel estimation results corresponding to the two DMRSs, so that better channel estimation performance may be achieved. The DMRS is set at the middle position of the time domain symbols for transmitting the PSCCH, so that the channel estimation result corresponding to the DMRS may be applied to symbols before and after the middle position to serve as channel estimation results on corresponding symbols, which can ensure the channel estimation performance similarly. In a case where the DMRS is set on the first time domain symbol of the PSCCH, a receiving end can perform channel estimation according to a detected DMRS as soon as possible, so as to ensure the channel estimation performance, and reduce the time delay.

Figure 7:
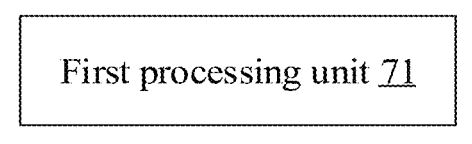

An embodiment of the disclosure provides a first device, as shown in FIG. 7, including: a first communication unit 91.

The first processing unit 71 is configured to determine, according to a number of time domain symbols occupied by resources for transmitting a PSSCH in one time slot, time domain positions of one or more DMRSs in the resources for transmitting the PSSCH.

The time domain positions of the one or more DMRSs in the resources for transmitting the PSSCH include:
the DMRSs are located at a first time domain symbol and a last time domain symbol of the resources for transmitting the PSCCH; or
the DMRS is located at a time domain symbol at a middle position of the resources for transmitting the PSSCH; or
the DMRS is located at the first time domain symbol of the resources for transmitting the PSSCH.

Figure 8:
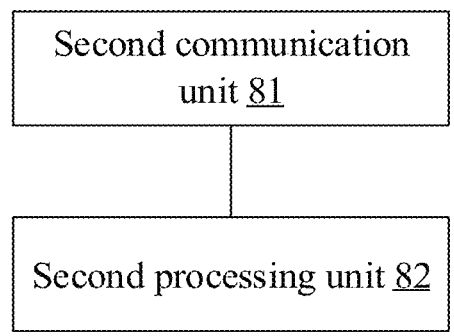
FIG. 8 illustrates a schematic structural diagram of compositions of a second device provided by an embodiment of the application.

Correspondingly, the present embodiment further provides a second device, as shown in FIG. 8, including: a second communication unit 81 and a second communication unit 82.

The second communication unit 81 is configured to receive a PSSCH and one or more DMRSs.

The second processing unit 82 is configured to demodulate the PSSCH based on detected DMRSs.

The time domain positions of the one or more DMRSs in resources for transmitting the PSSCH is:
the DMRSs are located at a first time domain symbol and a last time domain symbol of the resources for transmitting the PSCCH; or
the DMRS is located at a time domain symbol at a middle position of the resources for transmitting the PSSCH; or
the DMRS is located at the first time domain symbol of the resources for transmitting the PSSCH.

In the present embodiment, the foregoing first device and second device may be two terminal devices, or two UEs, particularly, may be two devices that can transmit and receive corresponding information in a V2X scenario. In addition, in the present embodiment, the first device may be a transmitting end device (or a transmitting end UE), and the second device may be a receiving end device (or a receiving end UE).

In the scheme provided by the present embodiment, the number of the time domain symbols occupied by the resources for transmitting the PSSCH is greater than or equal to 2 and is less than or equal to 4.

Descriptions are respectively made below by taking the numbers of the time domain symbols occupied by the PSSCH resource as 2, 3, and 4 as examples.

Example 1, a DMRS Pattern when the Resources for Transmitting PSSCH are 4 Symbols Specifically, in the first processing unit 71, in a case where the number of the time domain symbols occupied by the resources for transmitting the PSSCH in one time slot is 4, the number of the time domain symbols occupied by the DMRS is 2, and the DMRSs are located at the first time domain symbol and the last time domain symbol of the resources for transmitting the PSSCH.

It is to be noted that the time domain symbols occupied by the PSSCH are 4 continuous time domain symbols. In one time slot, the 4 continuous time domain symbols may be at any position at the beginning, middle, or back. No limits are made thereto in the present example.

In addition, a PSCCH corresponding to the PSSCH occupies 2 time domain symbols or 3 time domain symbols of the resources for transmitting the PSSCH.

Correspondingly, the second device may be understood as a receiving end device, or a receiving end UE. The PSSCH may be demodulated by detecting the DMRS, and specific demodulation processing will not be elaborated in the present embodiment.

It is to be noted that the second processing unit 82 of the second device determines where to detect a DMRS according to the number of the time domain symbols occupied by PSSCH resources and the number of time domain symbols of the PSSCH resources occupied by the PSCCH. The second processing unit 82 of the second device may perform channel estimation on a middle time domain symbol according to the detected DMRS on the first time domain symbol and the detected DMRS on the last time domain symbol. Specifically, the channel estimation may be performed by performing interpolation calculation through the DMRSs of the detected first time domain symbol and the detected last time domain symbol. Then, a final demodulation result is obtained.

Example 2, a DMRS Pattern when the Resources for Transmitting PSSCH are 3 Symbols The present example determines the pattern of the DMRS in combination with the number of the time domain symbols occupied by the PSCCH and the number of the PSSCH time domain symbols.

In one case, the PSCCH occupies 2 time domain symbols in the resources for transmitting the PSSCH.

Specifically, in the first processing unit 71, in a case where the number of the time domain symbols occupied by the resources for transmitting the PSSCH in one time slot is 3 and the PSCCH corresponding to the PSSCH occupies 2 time domain symbols of the resources of the PSSCH, the number of the time domain symbols occupied by the DMRS is 2, and the DMRSs are located at the first time domain symbol and the last time domain symbol of the resources for transmitting the PSSCH.

In another case, the PSCCH occupies 3 time domain symbols in the resources for transmitting the PSSCH.

Specifically, in the first processing unit 71, in a case where the number of the time domain symbols occupied by the resources for transmitting the PSSCH in one time slot is 3 and the PSCCH corresponding to the PSSCH occupies 3 time domain symbols of the resources of the PSSCH, the number of the time domain symbols occupied by the DMRS is 2, and the DMRSs are located at the first time domain symbol and the last time domain symbol of the resources for transmitting the PSSCH.

In another case, the PSCCH occupies 3 time domain symbols in the resources for transmitting the PSSCH.

Specifically, in the first processing unit 71, in a case where the number of the time domain symbols occupied by the resources for transmitting the PSSCH in one time slot is 3 and the PSCCH corresponding to the PSSCH occupies 3 time domain symbols of the resources of the PSSCH, the number of the time domain symbol occupied by the DMRS is 1, and the DMRS is located at a second time domain symbol in resources for transmitting the PSSCH.

Correspondingly, the second device may be understood as a receiving end device, or a receiving end UE. The PSSCH may be demodulated by detecting the DMRS, and specific demodulation processing will not be elaborated in the present embodiment.

It is to be noted that the second processing unit 82 of the second device determines where to detect a DMRS according to the number of the time domain symbols occupied by PSSCH resources and the number of time domain symbols of the PSSCH resources occupied by the PSCCH. For example, in a case where the PSSCH occupies 3 time domain symbols, and the PSCCH occupies 2 time domain symbols, it may be determined that 2 DMRSs need to be detected, and the positions thereof are the time domain symbols occupied by the first and last PSCCHs; or, in a case where the PSSCH occupies 3 time domain symbols, and the PSCCH occupies 3 time domain symbols, it may be determined that 2 DMRSs need to be detected, and the positions thereof are the time domain symbols occupied by the first and last PSCCHs; or, in a case where the PSSCH occupies 3 time domain symbols, and the PSCCH occupies 3 time domain symbols, it may be determined that 1 DMRS needs to be detected, and the position thereof is the second time domain symbol of the time domain symbols occupied by the PSCCH, that is, the middle time domain symbol.

Example 3, a DMRS Pattern when the Resources for Transmitting PSSCH are 2 Symbols The present example determines that there is 1 or 2 DMRSs in combination with the number of the time domain symbols occupied by the PSCCH and the number of the PSSCH time domain symbols. Respectively:

in a scenario with 2 DMRSs:
in the first processing unit 71, in a case where the number of the time domain symbols occupied by the resources for transmitting the PSSCH in one time slot is 2 and the PSCCH corresponding to the PSSCH occupies 2 time domain symbols of the resources of the PSSCH, the number of the time domain symbols occupied by the DMRS is 2, the DMRS is located at the first time domain symbol and the last time domain symbol in the resources for transmitting the PSSCH.

in a scenario with 1 DMRS:
in the first processing unit 71, in a case where the number of the time domain symbols occupied by the resources for transmitting the PSSCH in one time slot is 2 and the PSCCH corresponding to the PSSCH multiplexes 2 time domain symbols of the resources of the PSSCH, the number of the time domain symbols occupied by the DMRS is 1, and the DMRS is located at the first time domain symbol of the resources for transmitting the PSSCH.

Correspondingly, the second device may be understood as a receiving end device, or a receiving end UE. The PSSCH may be demodulated by detecting the DMRS, and specific demodulation processing will not be elaborated in the present embodiment.

It is to be noted that the second processing unit 82 of the second device determines where to detect a DMRS according to the number of the time domain symbols occupied by PSSCH resources and the number of time domain symbols of the PSSCH resources occupied by the PSCCH. For the present example, the second device may be configured to: determine that 2 DMRSs need to be detected in a case where the PSSCH occupies 2 time domain symbols, and the PSCCH occupies 2 time domain symbols, and the positions thereof are the time domain symbols occupied by the first and last PSCCHs; or determine that 1 DMRS needs to be detected in a case where the PSSCH occupies 2 time domain symbols, and the PSCCH occupies 2 time domain symbols, and the position thereof is the first time domain symbol occupied by the PSCCH.

Then, the second device may demodulate the PSSCH according to a detection condition of the DMRS.

In the present example, the case that two DMRSs are detected is the same as the foregoing example, which will not be elaborated. Different from the foregoing example, the second device in the present example can only detect the DMRS of the first time domain symbol. When the DMRS of the first time domain symbol can be detected, the second device can perform channel estimation and signal demodulation based on the detected DMRSs. The channel estimation and signal demodulation result of the DMRS of the first time domain symbol may be applied to another symbol, so that the channel estimation of the second device may be executed as early as possible by placing the DMRS on the first time domain symbol.

It can be seen that, by adopting the scheme provided by the present example, when both symbols include the DMRS, the channel estimation performance may be improved. When only one symbol includes the DMRS, the DMRS is located at the first symbol, and the channel estimation may be performed as early as possible, so that the time delay is reduced.

The foregoing examples 1 to 3 provide that the number and the position of the time domain symbols in the resources for transmitting the PSSCH occupied by the DMRS in combination with the number of the time domain symbols occupied by the PSCCH in a case where the numbers of the time domain symbols occupied by the PSSCH resources are 2, 3, and 4.

In the abovementioned embodiment, a DMRS design has the following features.

The DMRS only exists in the PRB occupied by the PSSCH. When a certain time domain symbol of the PRB includes the PSSCH DMRS, the PRB occupied by each PSSCH includes the DMRS.

The PSSCH DMRS does not occupy the resource where the PSCCH is located.

In each PRB including the DMRS, the DMRS symbol occupies 3 sub-carriers, and 4 sub-carriers are separated between two adjacent DMRS symbols.

It can be seen that, by adopting the abovementioned scheme, the positions of the one or more DMRSs can be set on a first time domain symbol, or the first time domain symbol and a last time domain symbol, or a middle time domain symbol of the time domain symbols for transmitting the PSCCH, so that more solutions for setting DMRS patterns can be provided. Moreover, the scheme provided by the present embodiment can adapt to the needs of more scenarios, particularly, the scenarios where the number of time domain symbols for transmitting the PSCCH is 2, 3, and 4. In addition, the DMRSs are set on the first symbol and the last time domain symbol of the time domain symbols for transmitting the PSCCH, and the channel estimation on a middle symbol of the time domain symbols of two DMRSs may be obtained by performing interpolating on channel estimation results corresponding to the two DMRSs, so that better channel estimation performance may be achieved. The DMRS is set at the middle position of the time domain symbols for transmitting the PSCCH, so that the channel estimation result corresponding to the DMRS may be applied to symbols before and after the middle position to serve as channel estimation results on corresponding symbols, which can ensure the channel estimation performance similarly. In a case where the DMRS is set on the first time domain symbol of the PSCCH, a receiving end can perform channel estimation according to a detected DMRS as soon as possible, so as to ensure the channel estimation performance, and reduce the time delay.

Figure 9:
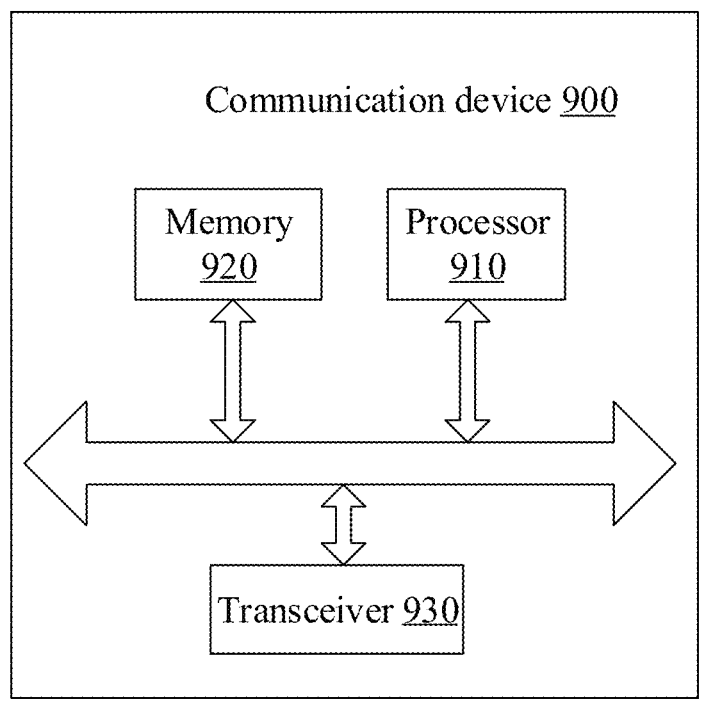
FIG. 9 is a schematic structural diagram of compositions of a communication device provided by an embodiment of the application.

FIG. 9 is a schematic structural diagram of a communication device 900 provided by an embodiment of the disclosure. The communication device in the embodiment may specifically be a first device or a second device in the forgoing embodiments. The communication device 900 as shown in FIG. 9 includes a processor 910. The processor 910 may call and run a computer program from a memory to implement the method in the embodiment of the disclosure.

Optionally, as shown in FIG. 9, the communications device 900 may further include a memory 920. The processor 910 may call and run the computer program from the memory 920 to implement the method in the embodiment of the disclosure.

The memory 920 may be independent of the processor 910, or may be integrated into the processor 910.

Optionally, as shown in FIG. 9, the communications device 900 may also include a transceiver 930. The processor 910 may control the transceiver 930 to be in communication with other devices, specifically, to send information or data to other devices, or receive the information or data sent by other devices.

The transceiver 930 may include a transmitter and a receiver. The transceiver 930 may further include an antenna. There may be one or more antennae.

Figure 10:
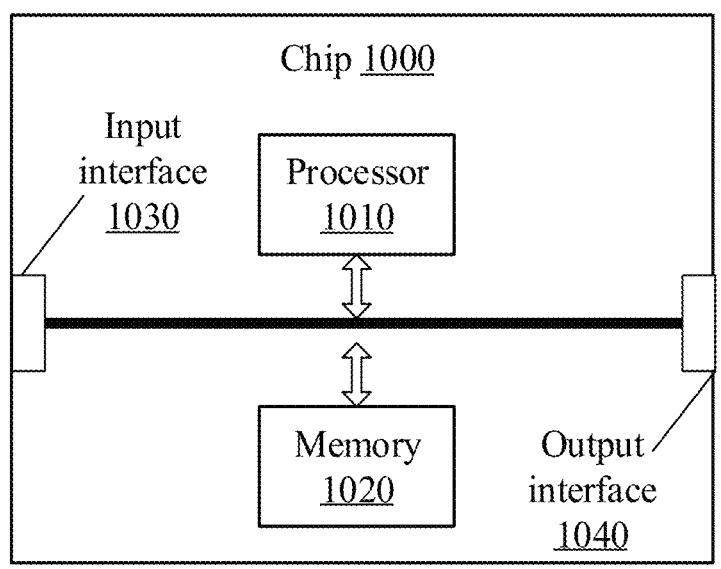
FIG. 10 is a schematic block diagram of a chip provided by an en embodiment of the application.

FIG. 10 is a schematic structure diagram of a chip according to an embodiment of the disclosure. The chip 1000 as shown in FIG. 10 includes a processor 1010. The processor 1010 may call and run a computer program from a memory to implement the method in the embodiment of the disclosure.

Optionally, as shown in FIG. 10, the chip 1000 may further include a memory 1020. The processor 1010 may call and run the computer program from the memory 1020 to implement the method in the embodiment of the disclosure.

The memory 1020 may be independent of the processor 1010, or may be integrated into the processor 1010.

Optionally, the chip 1000 may further include an input interface 1030. The processor 1010 may control the input interface 1030 to be in communication with other devices or chips, specifically, to acquire the information or data sent by other devices or chips.

Optionally, the chip 1000 may further include an output interface 1040. The processor 1010 may control the output interface 1040 to be in communication with other devices or chips, specifically, to output information or data sent to other devices or chips.

Optionally, the chip may be applied to a first device or a second device in the embodiments of the disclosure. The chip may implement a corresponding flow of various methods of the embodiments of the disclosure, which will not be elaborated herein for simplicity.

It should be understood that the chip mentioned in the embodiments of the disclosure may also be called a system-level chip, a system chip, a chip system, or a system on chip, etc.

It should be understood that the processor of the embodiments of the disclosure may be an integrated circuit chip with signal processing capacity. In an implementation process, each step of the abovementioned method embodiments may be completed by an integrated logic circuit of hardware in the processor or an instruction in the form of software. The abovementioned processor may be a general-purpose processor, a DSP, an ASIC, an FPGA, or other programmable logic devices, discrete gate or transistor logic devices, and discrete hardware components. It may implement or perform the methods, the steps, and logical block diagrams that are disclosed in the embodiments of the present invention. The general-purpose processor may be a microprocessor, or the processor may also be any conventional processor or the like. Steps of the methods disclosed with reference to the embodiments of the present invention may be directly performed by a hardware decoding processor, or may be performed by using a combination of hardware and software modules in the decoding processor. The software module may be located in a storage medium mature in the art, such as a random access memory, a flash memory, a read-only memory, a programmable read-only memory or electrically erasable programmable memory, or a register. The storage medium is located in the memory, and the processor reads information in the memory and completes the steps in the foregoing methods in combination with hardware of the processor.

It may be understood that the memory in the embodiments of the present invention may be a volatile memory or a nonvolatile memory, or may include a volatile memory and a nonvolatile memory. The nonvolatile memory can be a Read-Only Memory (ROM), a programmable ROM (PROM), an Erasable Prom (EPROM), an Electrically Erasable EPROM (EEPROM) or a flash memory. The volatile memory may be a random access memory (Random Access Memory, RAM), which is used as an external cache. By way of example but not restrictive description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchronous link dynamic random access memory (Synchlink DRAM, SLDRAM), and a direct rambus random access memory (Direct Rambus RAM, DRRAM). It should be noted that the memory of the systems and methods described in this specification includes but is not limited to these and any other proper types of memories.

It should be understood that the abovementioned memories are exemplary but not restrictive, for example, the memory in the embodiments of the disclosure may also be a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDRSDRAM), an enhanced synchronous dynamic random access memory (enhanced SDRAM, ESDRAM), a synchronous link dynamic random access memory (synch link DRAM, SLDRAM), and a direct rambus random access memory (Direct Rambus RAM, DRRAM). That is to say, the memories described in the embodiment of the disclosure are intended to include, but not limited to, these and any other suitable types of memories.

The embodiments of the disclosure further provide a computer readable storage medium, which is configured to store a computer program.

Optionally, the computer readable storage medium may be applied to a network device or a satellite or a terminal device in the embodiments of the disclosure. The computer program enables a computer to perform corresponding flows implemented by the network device in each method of the embodiments of the disclosure, which will not be elaborated here for simplicity.

The embodiments of the disclosure further provide a computer program product, which including a computer program instruction.

Optionally, the computer program product may be applied to a network device or a satellite in the embodiments of the disclosure. The computer program instruction enables a computer to perform corresponding flows implemented by the network device in each method of the embodiments of the disclosure, which will not be elaborated here for simplicity.

The embodiments of the disclosure further provide a computer program.

Optionally, the computer program may be applied to a network device or a satellite in the embodiments of the disclosure. The computer program runs in a computer to enable the computer to perform corresponding flows implemented by the network device in each method of the embodiments of the disclosure, which will not be elaborated here for simplicity.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the several embodiments provided in the disclosure, it should be understood that the disclosed system, apparatus, and method may be implemented in other modes. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of the present invention may be integrated into one processing unit, or each of the units may exist alone physically, or two or more units may be integrated into one unit.

When the functions are implemented in a form of a software functional unit and sold or used as an independent product, the functions may be stored in a computer readable storage medium. Based on such an understanding, the technical solutions of the disclosure essentially, or the part contributing to the prior art, or some of the technical solutions may be implemented in a form of a software product. The computer software product is stored in a storage medium, and includes a plurality of instructions for instructing a computer device (which may be a personal computer, a server, a network device, etc.) to perform all or part of the steps of the methods in various embodiments of the disclosure. The abovementioned storage medium includes: various media capable of storing program codes such as a U disk, a mobile hard disk, a ROM, a RAM, a magnetic disk, or an optical disk.

The above is only a specific implementation mode of the disclosure and not intended to limit the scope of protection of the disclosure. Any variation or replacement readily figured out by a person skilled in the art within the technical scope disclosed in the disclosure shall fall within the scope of the protection of the disclosure. Therefore, the scope of protection of the disclosure shall be subject to the scope of the protection of the claims.

The invention claimed is:

1. A Demodulation Reference Signal (DMRS) configuration method, comprising:
   determining, by a first device according to a number of time domain symbols occupied by resources for transmitting a Physical Sidelink Share Channel (PSSCH) in one time slot, time domain positions of one or more DMRSs in the resources for transmitting the PSSCH,
   wherein the time domain positions of the one or more DMRSs in the resources for transmitting the PSSCH comprise:

the DMRSs are located at a first time domain symbol and a last time domain symbol of the resources for transmitting the PSSCH; or the DMRS is located at a time domain symbol at a middle position of the resources for transmitting the PSSCH; or the DMRS is located at the first time domain symbol of the resources for transmitting the PSSCH, wherein the determining, according to a number of time domain symbols occupied by resources for transmitting a PSSCH in one time slot, time domain positions of one or more DMRSs in the resources for transmitting the PSSCH comprises one of:

in a case where the number of the time domain symbols occupied by the resources for transmitting the PSSCH in one time slot is 3 and a Physical Sidelink Control Channel (PSCCH) corresponding to the PSSCH occupies 3 time domain symbols of the resources of the PSSCH, the number of the time domain symbols occupied by the DMRS is 2, and the DMRSs are located at the first time domain symbol and the last time domain symbol of the resources for transmitting the PSSCH; or in a case where the number of the time domain symbols occupied by the resources for transmitting the PSSCH in one time slot is 3 and the PSCCH corresponding to the PSSCH occupies 3 time domain symbols of the resources of the PSSCH, the number of the time domain symbol occupied by the DMRS is 1, and the DMRS is located at a second time domain symbol of the resources for transmitting the PSSCH; or in a case where the number of the time domain symbols occupied by the resources for transmitting the PSSCH in one time slot is 3 and the PSCCH corresponding to the PSSCH occupies 2 time domain symbols of the resources of the PSSCH, the number of the time domain symbols occupied by the DMRS is 2, and the DMRSs are located at the first time domain symbol and the last time domain symbol of the resources for transmitting the PSSCH; or in a case where the number of the time domain symbols occupied by the resources for transmitting the PSSCH in one time slot is 2 and the PSCCH corresponding to the PSSCH occupies 2 time domain symbols of the resources of the PSSCH, the number of the time domain symbols occupied by the DMRS is 2, and the DMRSs are located at the first time domain symbol and the last time domain symbol of the resources for transmitting the PSSCH; or in a case where the number of the time domain symbols occupied by the resources for transmitting the PSSCH in one time slot is 2 and the PSCCH corresponding to the PSSCH multiplexes 2 time domain symbols of the resources of the PSSCH, the number of the time domain symbols occupied by the DMRS is 1, and the DMRS is located at the first time domain symbol of the resources for transmitting the PSSCH.

2. The method of claim 1, wherein the number of the time domain symbols occupied by the resources for transmitting the PSSCH is greater than or equal to 2 and is less than or equal to 4.

3. A Demodulation Reference Signal (DMRS) receiving method, comprising:

receiving, by a second device, a Physical Sidelink Share Channel (PSSCH) and one or more DMRSs, and demodulating the PSSCH based on detected DMRSs, wherein time domain positions of the one or more DMRSs in resources for transmitting the PSSCH comprise:

the DMRSs are located at a first time domain symbol and a last time domain symbol of the resources for transmitting the PSSCH; or the DMRS is located at a time domain symbol at a middle position of the resources for transmitting the PSSCH; or the DMRS is located at the first time domain symbol of the resources for transmitting the PSSCH, wherein the method further comprises one of:

in a case where a number of the time domain symbols occupied by the resources for transmitting the PSSCH in one time slot is 3 and a Physical Sidelink Control Channel (PSCCH) corresponding to the PSSCH occupies 3 time domain symbols of the resources of the PSSCH, the number of the time domain symbols occupied by the DMRS is 2, and the DMRSs are located at the first time domain symbol and the last time domain symbol of the resources for transmitting the PSSCH; or in a case where the number of the time domain symbols occupied by the resources for transmitting the PSSCH in one time slot is 3 and the PSCCH corresponding to the PSSCH occupies 3 time domain symbols of the resources of the PSSCH, the number of the time domain symbol occupied by the DMRS is 1, and the DMRS is located a second time domain symbol of the resources for transmitting the PSSCH; or in a case where the number of the time domain symbols occupied by the resources for transmitting the PSSCH in one time slot is 3 and the PSCCH corresponding to the PSSCH occupies 2 time domain symbols of the resources of the PSSCH, the number of the time domain symbols occupied by the DMRS is 2, and the DMRSs are located at the first time domain symbol and the last time domain symbol of the resources for transmitting the PSSCH; or in a case where the number of the time domain symbols occupied by the resources for transmitting the PSSCH in one time slot is 2 and the PSCCH corresponding to the PSSCH occupies 2 time domain symbols of the resources of the PSSCH, the number of the time domain symbols occupied by the DMRS is 2, and the DMRSs are located at the first time domain symbol and the last time domain symbol of the resources for transmitting the PSSCH; or in a case where the number of the time domain symbols occupied by the resources for transmitting the PSSCH in one time slot is 2 and the PSCCH corresponding to the PSSCH multiplexes 2 time domain symbols of the resources of the PSSCH, the number of the time domain symbols occupied by the DMRS is 1, and the DMRS is located at the first time domain symbol of the resources for transmitting the PSSCH.

4. The method of claim 3, wherein a number of the time domain symbols occupied by the resources for transmitting the PSSCH is greater than or equal to 2 and is less than or equal to 4.

5. A first device, comprising:

a memory storing processor-executable instructions; and a processor configured to execute the stored processor-executable instructions to perform an operation of:

determining, according to a number of time domain symbols occupied by resources for transmitting a Physical Sidelink Share Channel (PSSCH) in one time slot, time domain positions of one or more Demodulation Reference Signals (DMRSs) in the resources for transmitting the PSSCH, wherein the time domain positions of the one or more DMRSs in the resources for transmitting the PSSCH comprise:

the DMRSs are located at a first time domain symbol and a last time domain symbol of the resources for transmitting the PSSCH; or the DMRS is located at a time domain symbol at a middle position of the resources for transmitting the PSSCH; or the DMRS is located at the first time domain symbol of the resources for transmitting the PSSCH, wherein the determining, according to a number of time domain symbols occupied by resources for transmitting a PSSCH in one time slot, time domain positions of one or more DMRSs in the resources for transmitting the PSSCH comprises one of:

in a case where the number of the time domain symbols occupied by the resources for transmitting the PSSCH in one time slot is 3 and a Physical Sidelink Control Channel (PSCCH) corresponding to the PSSCH occupies 3 time domain symbols of the resources of the PSSCH, the number of the time domain symbols occupied by the DMRS is 2, and the DMRSs are located at the first time domain symbol and the last time domain symbol of the resources for transmitting the PSSCH; or in a case where the number of the time domain symbols occupied by the resources for transmitting the PSSCH in one time slot is 3 and the PSCCH corresponding to the PSSCH occupies 3 time domain symbols of the resources of the PSSCH, the number of the time domain symbol occupied by the DMRS is 1, and the DMRS is located at a second time domain symbol of the resources for transmitting the PSSCH; or in a case where the number of the time domain symbols occupied by the resources for transmitting the PSSCH in one time slot is 3 and the PSCCH corresponding to the PSSCH occupies 2 time domain symbols of the resources of the PSSCH, the number of the time domain symbols occupied by the DMRS is 2, and the DMRSs are located at the first time domain symbol and the last time domain symbol of the resources for transmitting the PSSCH; or in a case where the number of the time domain symbols occupied by the resources for transmitting the PSSCH in one time slot is 2 and the PSCCH corresponding to the PSSCH occupies 2 time domain symbols of the resources of the PSSCH, the number of the time domain symbols occupied by the DMRS is 2, and the DMRSs are located at the first time domain symbol and the last time domain symbol of the resources for transmitting the PSSCH; or in a case where the number of the time domain symbols occupied by the resources for transmitting the PSSCH in one time slot is 2 and the PSCCH corresponding to the PSSCH multiplexes 2 time domain symbols of the resources of the PSSCH, the number of the time domain symbols occupied by the DMRS is 1, and the DMRS is located at the first time domain symbol of the resources for transmitting the PSSCH.

6. The first device of claim 5, wherein the number of the time domain symbols occupied by the resources for transmitting the PSSCH is greater than or equal to 2 and is less than or equal to 4.

* * * * *